United States Patent Office 3,544,573
Patented Dec. 1, 1970

3,544,573
PIGMENT DYES OF THE PERINONE SERIES
Otto Christmann, Ludwigshafen (Rhine), Germany, assignor to Badische Anilin- & Soda-Fabrik Aktiengesellschaft, Ludwigshafen (Rhine), Germany
No Drawing. Filed Apr. 23, 1968, Ser. No. 723,564
Claims priority, application Germany, Apr. 27, 1967, 1,569,670
Int. Cl. C07d 51/48
U.S. Cl. 260—256.4                              2 Claims

ABSTRACT OF THE DISCLOSURE

Perinones obtainable from 3,3',4,4'-benzophenone tetracarboxylic acid and ortho-phenylenediamines or perinaphthylenediamines are valuable pigment dyes which are particularly advantageous for mass coloration of polyamides and polyesters.

It is known that particularly high thermostability is required of pigment dyes which are to be used for mass coloration of polyamides. Since there is a pronounced lack of organic pigments having yellow to red shade and high thermostability, there has been a desire to synthesize pigment dyes which will to a great extent fulfill the requirements.

This invention relates to yellow to red pigment dyes of the perinone series which are distinguished particularly by outstanding thermostability. These new dyes have the general formula:

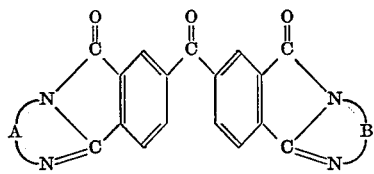

in which A and B each denotes one of the radicals:

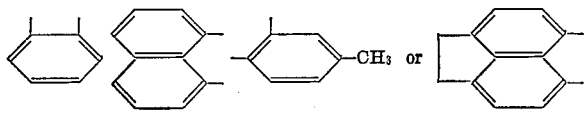

The new dyes are prepared by reacting a 3,3',4,4'-benzophenone tetracarboxylic acid or a derivative of such an acid with a diamine having the general formula:
H$_2$N—A—NH$_2$ or H$_2$N—B—NH$_2$ in which A and B have the above meanings.

Examples of diamines having the above formulae are 1,8-diamino-naphthalene, ortho-phenylenediamine, 1,2-diamino-4-methylbenzene and 5,6-diaminoacenaphthene.

Instead of free 3,3',4,4'-benzophenone tetracarboxylic acid it is possible to use derivatives of this acid, such as the acid halides or esters. The use of the dianhydride of the acid is of special industrial interest.

The reaction for the preparation of the new dyes may be carried out for example by heating 3,3',4,4'-benzophenone tetracarboxylic dianhydride with the diamines at temperatures of from 100° to 220° C. Bilateral condensation takes place with the formation of the new dye. The condensation may advantageously be carried out in the presence of solvents, for example in nitrobenzene, dichlorobenzene, trichlorobenzene, p-diisopropylbenzene or acetic acid at refluxing temperature, the water formed during the reaction being removed by distillation.

The new and valuable pigment dyes have good fastness properties. They are outstandingly suitable for mass coloration of natural or synthetic macromolecular substances, such as polyethylene, polypropylene, polyesters, phenoplasts, aminoplasts and rubber and particularly for coloring polyamides.

The said substances are colored by conventional methods, about 0.05 to 5 parts by weight of dye being used with reference to 100 parts by weight of the substance to be dyed.

The new dyes are superior to the pigment dyes known from British patent specification No. 730,692, for example in the mass coloration of polyamides or polyesters by considerably better thermostability and by better textile fastness properties in dope dyeing. The dye having the Formula I in which both A and B denote the 1,8-diaminonaphthyl radical having particular industrial interest.

The invention is illustrated by the following examples in which the parts specified are parts by weight.

EXAMPLE 1

161 parts of 3,3',4,4'-benzophenone tetracarboxylic dianhydride and 160 parts of 1,8-diaminonaphthalene in 2300 parts of nitrobenzene are heated under reflux for five hours. The water of condensation formed during the reaction is distilled off and the reaction product is suction filtered at room temperature. The filter cake is washed with methanol until all nitrobenzene has been removed and then dried at about 60° to 70° C. The yield is 275 to 283 parts of a red pigment having the formula:

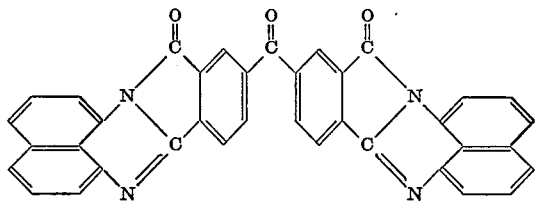

EXAMPLE 2

16.1 parts of 3,3',4,4'-benzophenone tetracarboxylic dianhydride and 12 parts of ortho-phenylenediamine in 300 parts of nitrobenzene are heated for about six hours at refluxing temperature. The water formed during the reaction is separated as described in Example 1. After the condensation is over, the solvent is removed by steam distillation and the residue is suction filtered and washed with a little methanol. The yield is about 20 parts of yellow pigment dye having the Formula I in which A and B both denote an ortho-phenylene radical.

If the ortho-phenylenediamine in this example be replaced by 12.8 parts of 1,2-diamino-4-methylbenzene, about 20 parts of the corresponding yellow pigment is obtained having similar pigmentary properties.

EXAMPLE 3

16.1 parts of 3,3',4,4'-benzophenone tetracarboxylic dianhydride and 5.4 parts of ortho-phenylenediamine in 300 parts of nitrobenzene are heated under reflux for three hours, the water formed being distilled off. Then 8 parts of 1,8-diaminonaphthalene is added. The mixture is heated at reflux temperature for another five hours, water of condensation being removed by distillation. The product is worked up as described in Example 2. About 23 parts of an orange red pigment dye is obtained having the formula:

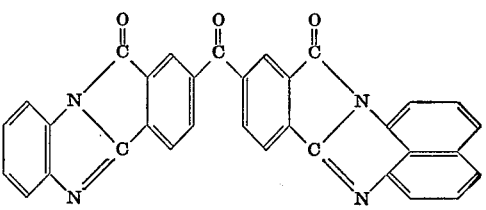

I claim:
1. A dye having the general formula:
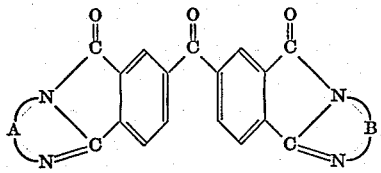
in which A and B each denotes one of the radicals:
 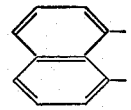 and 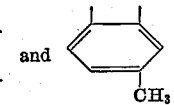
2. The dye having the formula:
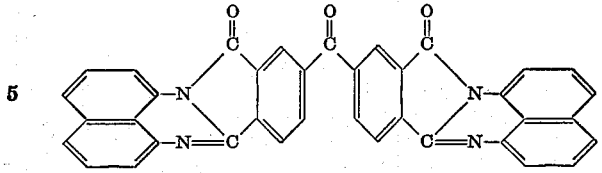
References Cited
UNITED STATES PATENTS
2,884,423   4/1959   Wilkinson _____ 260—256.4
ALEX MAZEL, Primary Examiner
R. J. GALLAGHER, Assistant Examiner
U.S. Cl. X.R.
260—37, 39, 40, 41, 309.2, 764